Aug. 17, 1937.    W. T. BALLOU    2,090,020
IGNITION SYNCHRONIZER
Filed April 16, 1934

INVENTOR:
WALTER T BALLOU,
By Fred W Harris
ATTORNEY.

Patented Aug. 17, 1937

2,090,020

UNITED STATES PATENT OFFICE 2,090,020

IGNITION SYNCHRONIZER

Walter T. Ballou, Los Angeles, Calif.

Application April 16, 1934, Serial No. 720,780

12 Claims. (Cl. 116—114)

My invention relates to a gauge for measuring the rotation of a shaft, which gauge finds particular utility as a device for synchronizing the breaker points on a distributor head of an automobile.

Certain types of distributor heads employ a double set of breaker points which are operated by a single cam. It is necessary to accurately synchronize these sets of points so that they are alternately opened at equal degrees of rotation of the cam.

My invention is directed to a synchronizing device which may be secured to a shaft driving the cam to permit an accurate gauging of the rotation thereof for synchronizing the setting of the breaker points.

It is an object of my invention to provide a gauge of the above class which has a structure permitting accurate determination of the rotation of the shaft.

It is an object of the invention to provide a gauge which may be secured to a shaft and operated without reference to any markings on the shaft or distributor head.

Another object of the invention is to provide a gauge which may be used with equal facility on distributor heads for automobiles having any number of cylinders.

It is also an object of the invention to provide a gauge which may be secured to distributor heads having different sizes of shafts.

It is another object of my invention to provide a gauge providing means for accurately gauging the duration of contact of the breaker points of a distributor head for automobiles.

Other objects reside in the particular construction of the preferred form of my invention, which, together with the above-stated objects, will be apparent from a perusal of the following part of the specification and the appended claims in connection with the accompanying drawing.

Referring to the drawing.

Figure 1:
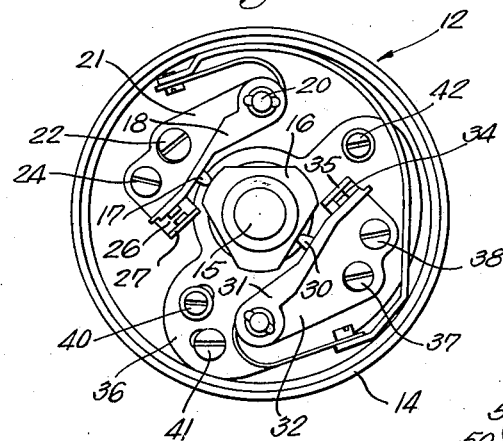
Fig. 1 is a plan view of a distributor head to which a synchronizing device of my invention may be applied for synchronizing purposes.
Figure 2:
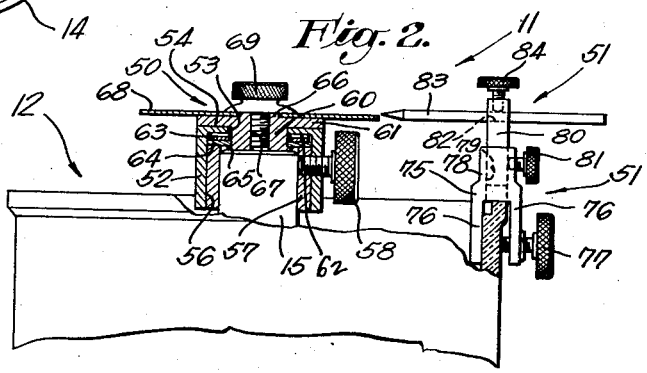
Fig. 2 is a side elevation of a distributor head with a portion thereof broken away to show the manner in which the synchronizing device is applied thereto.
Figure 3:
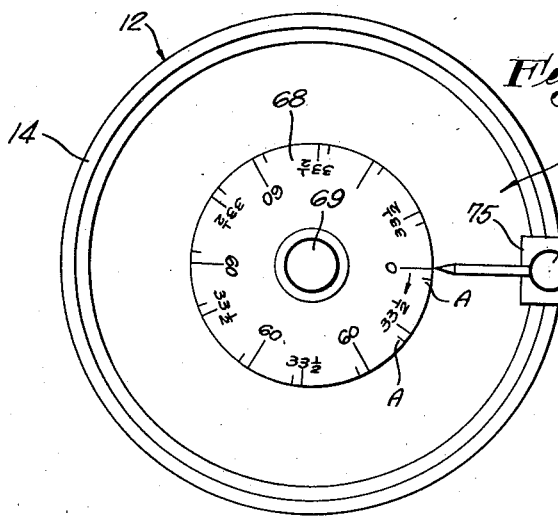
Fig. 3 is a plan view showing a device of my invention applied to the distributor head shown in Fig. 1.

A synchronizing device 11 of my invention, as shown in Figs. 1, 2, and 3 inclusive, is adapted to be applied for synchronizing purposes to a distributor head 12 of the type shown in Fig. 1. This is a well known type of distributor head and no claims are made to it; however, I will describe the essential parts thereof for completeness.

The distributor head 12 consists essentially of a cup-shaped body or box 14 in which is journalled a vertical shaft 15, the upper end of which extends inside the body 14 and carries a cam 16 which has three lobes for a six-cylinder engine, four lobes for an eight-cylinder engine, etc. Engaging the external surface of the cam 16 is a rubbing block 17 carried by a breaker arm 18 which is pivotally supported on a pin 20 secured to a base 21, the base 21 being adjustably secured to the body 14 by an adjusting screw 22 and a clamping screw 24. The arm 18 carries one of a pair of breaker points 26, the other being carried by a post 27 formed on the base 21 so that the contact between the breaker points 26 is broken when the rubbing block 17 is raised on a lobe of the cam 16, as shown in Fig. 1. The breaker points 26 and associated apparatus are termed the stationary breaker points to distinguish them from a similar arrangement of movable breaker points which are placed diametrically opposite thereto. This arrangement of movable breaker points comprises a rubbing block 30 on an arm 31 pivotally secured to a base 32, the arm 31 carrying one of a pair of breaker points 34, the other being carried by a post 35 formed on the base 32. The base 32 is secured to an adjusting block 36 by an adjusting screw 37 and clamping screw 38. The adjusting block 36 is pivoted on the body 14 by a pivot screw 42 and is movable by an eccentric screw 40 which engages the walls of a slot in the block 36 to adjust the position of the rubbing block 30 relative to the cam 16 when the screw 40 is rotated. A clamping screw 41 is provided to normally secure the block 36 against movement relative to the body. The screw 41 extends through an arcuate slot which permits the block 36 to pivot when the clamping screw is loosened.

Figure 4:
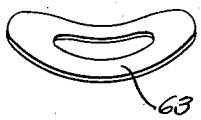
Fig. 4 is a perspective view of a special washer used in my invention.

The synchronizing device 11 of my invention comprises a movable gauge 50 and an indicator assembly 51. The gauge 50 comprises a cylindrical body 52 in the upper end of which is a bore 53 opening on an upper face 54 of the body 52 and in the lower end of which is a counterbore 56 opening on a lower face of the body. The counterbore 56 is of a size to receive the largest sizes of shafts used on distributor heads with which my device is to be used. A bushing 57 is provided for fitting the counterbore 56 to the shaft 15 when the shaft 15 is smaller than the largest with which my device is to be used. Various other bushings are provided for adapting the counterbore to different sizes of shafts. Threaded in the body 52 is a setscrew 58 for securing the body 52 to the shaft 15. The bore 53 rotatably receives a depending pin 60 on a cap 61 which has a lower face slidably engaging the upper face of the body 52. Engaging a shoulder 62 formed in the body 52 between the bore 53 and the counterbore 56 is a special spring washer 63, a perspective view of which is shown in Fig. 4.

The spring washer 63 is compressed against the shoulder 62 by an ordinary washer 64 which is retained in place by the lower upset end 65 of the pin 60, thus providing friction means for resisting rotation between the body 52 and the cap 61. Formed on the upper face is an upwardly extending circular boss 66, and provided centrally therein is a threaded bore 67.

The invention includes a circular gauge member or disc 68 having a central opening therein adapted to receive the boss 66. A setscrew 69 threadedly engages the bore 67, as shown in Fig. 2, to retain the disc 68 rigidly on the cap 61. The disc 68 is provided with suitable indicia, as shown in Fig. 3, the purpose of which will be described later.

My invention includes an indicator assembly comprising a clamp member 75 having relatively spaced legs 76 through one of which a setscrew 77 threadedly extends in the manner shown best in Fig. 2. The upper portion 78 of the clamp 75 provides a vertically extending bore 79 adapted to slidably receive a post 80. A setscrew 81 which threadedly engages the upper portion of the clamp 75 is provided in the manner shown to rigidly secure the post 80 to the clamp 75 in various vertical positions. Provided in the upper end of the post 80 is a horizontally extending opening 82 adapted to receive a pointer 83 preferably of the type indicated. A setscrew 84 is provided substantially in the manner shown to rigidly secure the pointer 83 in the various horizontal positions.

The operation of my synchronizing device is as follows. The distributor cap and the rotor button are first removed from the distributor 12 and the body 52 of the gauge is securely clamped to the distributor shaft 15 in the manner shown in Fig. 2 by screwing up the setscrew 58. A suitably bored bushing 57 is used depending on the size of the shaft 15. The indicator assembly 51 is securely clamped to the rim of the distributor housing 14 by screwing up the setscrew 77 in the manner shown in Fig. 2. The pointer 83 is adjusted horizontally so that the point thereof extends very close to, or slightly above, the periphery of the disc 68.

The stationary and movable breaker points are then adjusted to the specified gap for the particular unit to be tested and the shaft 15 rotated in its normal direction of rotation, which in the distributor head shown in Figs. 1 and 3 is clockwise as viewed from above, until the stationary breaker points 26 have just opened.

The cap 61 is then rotated relative to the body 52 until the pointer exactly coincides with the zero graduation on the gauge disc 68, as shown in Fig. 3.

The shaft 15 is then again rotated in its normal direction of rotation until the pointer exactly coincides with a specified graduation mark on the disc which is the correct breaking point of the movable breaker points. The clamping screw 41 of the movable breaker point arrangement may then be loosened and the breaker points 34 set by operating the adjustment screw 40 so that these movable points 34 just open at that point.

Ordinarily, the distributor breaker points of an eight-cylinder car are arranged to break at 45° intervals and six-cylinder cars at 60° intervals; this, however, varies with different makes of cars and with cars having increasing numbers of cylinders. Interchangeable gauge discs 68 having different graduations for indicating the breaking points of all of the different makes of cars are a feature of the invention and are preferably provided, obviating the confusion resulting from placing a great number of graduation marks and symbols on any single disc 68. Thus, as shown in Fig. 3, the disc 68 is graduated to indicate the breaking points of a twelve-cylinder car occurring at 26½° and 33½° intervals alternately. As shown, the 26½° graduations are numbered 60 to facilitate the use of this particular disc in connection with distributors of six-cylinder cars breaking at 60° intervals.

If desired, graduation marks may be provided on the gauge disc 68 to indicate the proper duration of contact of the breaker points, so that the breaker points may be set according to a specified duration of contact without recourse to a specified width of gap between the breaker points. These graduation marks may be provided on separate discs prepared for certain makes of cars, or, as indicated at A in Fig. 3, may be provided in addition to the graduation marks indicating the breaking points at which the primary circuit is interrupted. Thus the space between zero and the first A to the leftward thereof, as viewed in Fig. 3, indicates the interval during which the primary circuit is broken and the space between this A and the 33½° mark indicates the duration of contact of one set of breaker points. The distance between 33½° and the second A indicates the second interval during which the primary circuit is broken, etc. Thus the breaker points may be adjusted, substantially in the manner described above, so that a specified duration of contact may be gauged as well as the proper breaking points.

It is to be understood that, although I have shown and described only one complete embodiment of my invention, I am aware of various modifications thereof and numerous changes that might be made therein, all coming within the scope of the invention as interpreted by the appended claims.

I claim as my invention:

1. A device of the character described for synchronizing a distributor of an internal combustion engine having a stationary housing part, a shaft rotatable therein, and adjustable contacts which are opened and closed upon rotation of said shaft, said device including: a body secured to the rotatable shaft of said distributor for movement therewith; a cap rotatable on said body; a disc removably secured to said cap; angular graduations on said disc representing duration of contact of the breaker points of said distributor; and indicator means supported by the stationary housing part of said distributor for gauging the movement of said graduations to indicate the duration of contact of said breaker points, said cap and said disc being rotatable relative to said indicator means without removing said body from said shaft.

2. A device of the character described for synchronizing a distributor of an internal combustion engine having a stationary housing part, a shaft rotatable therein, and adjustable contacts which are opened and closed upon rotation of said shaft, said device including: a body secured to the rotatable shaft of said distributor for movement therewith; a cap rotatable on said body; a disc removably secured to said cap; angular graduations on said disc representing duration of contact of the breaker points of said distributor and the breaking points of said breaker points; and indicator means supported by the stationary housing part of said distributor for gauging the movement of said graduations, said cap and said disc being rotatable relative to said indicator means without removing said body from said shaft.

3. A device of the character described for synchronizing a distributor of an internal combustion engine having a stationary housing part, a shaft rotatable therein, and adjustable contacts which are opened and closed upon rotation of said shaft, said device including: a body secured to the rotatable shaft of said distributor for movement therewith; a cap rotatable on said body; a disc removably secured to said cap; angular graduations on said disc representing duration of contact of the breaker points of said distributor; and stationary indicator means supported by the stationary housing part of said distributor secured to said distributor for gauging the movement of said graduations to indicate the duration of contact of said breaker points, said cap and said disc being rotatable relative to said indicator means without removing said body from said shaft.

4. A device of the character described for synchronizing a distributor of an internal combustion engine having a stationary housing part, a shaft rotatable therein, and adjustable contacts which are opened and closed upon rotation of said shaft, said device including: a body secured to the rotatable shaft of said distributor for movement therewith; a cap rotatable on said body; a disc removably secured to said cap; angular graduations on said disc representing duration of contact of the breaker points of said distributor and the breaking points of said breaker points; and stationary indicator means secured to the stationary housing part of said distributor for gauging the movement of said graduations, said cap and said disc being rotatable relative to said indicator means without removing said body from said shaft.

5. A device of the character described for synchronizing a distributor of an internal combustion engine having a stationary housing part, a shaft rotatable therein, and adjustable contacts which are opened and closed upon rotation of said shaft, said device including: a body adapted to be secured to the rotatable shaft of said distributor for movement therewith, said body including a relatively rotatable cap having angular graduations thereon; and stationary pointer means supported by the stationary housing part of said distributor for indicating said graduations to show angular movement of said shaft, said cap being rotatable relative to said pointer without removing said body from said shaft.

6. A device of the character described for synchronizing a distributor of an internal combustion engine having a stationary housing part, a shaft rotatable therein, and adjustable contacts which are opened and closed upon rotation of said shaft, said device including: a body adapted to be secured to the rotatable shaft of said distributor for movement therewith, said body including a relatively rotatable cap having angular graduations thereon; and pointer means secured to the stationary housing part of said distributor for indicating said graduations to show angular movement of said shaft, said cap being rotatable relative to said pointer without removing said body from said shaft.

7. A device of the character described for synchronizing a distributor of an internal combustion engine having a stationary housing part, a shaft rotatable therein, and adjustable contacts which are opened and closed upon rotation of said shaft, said device including: a body adapted to be secured to the rotatable shaft of said distributor for movement therewith, said body including a relatively rotatable cap; a gauge member having graduations thereon removably secured to said cap; and stationary pointer means supported by the stationary housing part of said distributor for indicating said graduations to show angular movement of said shaft, said cap being rotatable relative to said pointer without removing said body from said shaft.

8. A device of the character described for synchronizing a distributor of an internal combustion engine having a stationary housing part, a shaft rotatable therein, and adjustable contacts which are opened and closed upon rotation of said shaft, said device including: a body adapted to be secured to the rotatable shaft of said distributor for movement therewith; a relatively rotatable cap secured to said body; friction means operable to resist relative rotation between said body and said cap; a gauge member having graduations thereon removably secured to said cap; and stationary pointer means supported by the stationary housing part of said distributor for indicating said graduations to show angular movement of said shaft, said cap and said gauge member being rotatable relative to said pointer without removing said body from said shaft.

9. A device of the character described for synchronizing a distributor of an internal combustion engine having a stationary housing part, a shaft rotatable therein, and adjustable contacts which are opened and closed upon rotation of said shaft, said device including: a body secured to the rotatable shaft of said distributor for rotation therewith; a relatively rotatable cap secured to said body said cap having angular graduations thereon representing the duration of contact of the breaker points of said distributor; and indicator means supported by the stationary housing part of said distributor for gauging the movement of said graduations when said shaft is rotated to indicate the duration of contact of said breaker points, said cap being rotatable to move said graduations relative to said indicator means without removing said body from said shaft.

10. In a synchronizing device for use in conjunction with a distributor including a stationary housing part, a shaft rotatable therein, and adjustable contacts opened and closed upon rotation of said shaft, the combination of: a body adapted to be rigidly secured to said shaft so as to be non-rotatable relative to said shaft; a pointer means secured to said housing; and a gauge member having graduation marks thereon removably mounted on said body, said pointer means and said gauge member cooperating so that said graduations are indicated in succession upon rotation of said shaft to indicate the amount of rotation thereof.

11. In a synchronizing device for use in conjunction with a distributor including a stationary housing part, a shaft rotatable therein, and adjustable contacts opened and closed upon rotation of said shaft, the combination of: a body adapted to be rigidly secured to said shaft so as to be non-rotatable relative to said shaft; a pointer means secured to said housing; a concentric boss supported by said body; and a gauge member having a central opening, said gauge member being placed on said body with said boss extending into said opening, and said gauge member having graduation marks thereon, said pointer means and said gauge member cooperating so that said graduations are indicated in succession upon rotation of said shaft to indicate the amount of rotation thereof.

12. In a synchronizing device for use in conjunction with a distributor including a stationary housing part, a shaft rotatable therein, and adjustable contacts opened and closed upon rotation of said shaft, the combination of: a body adapted to be rigidly secured to said shaft so as to be non-rotatable relative to said shaft; a pointer means secured to said housing; and a gauge member having graduation marks thereon removably mounted on said body, said pointer means and said gauge member cooperating so that said graduations are indicated in succession upon rotation of said shaft to indicate the amount of rotation thereof, and said gauge member and said pointer means being relatively adjustable independently of said shaft to permit said synchronizing device to be adjusted to starting position without moving said shaft.

WALTER T. BALLOU.